United States Patent [19]
Lin

[11] Patent Number: 5,718,940
[45] Date of Patent: Feb. 17, 1998

[54] METHOD FOR MAKING A VEGETARIAN YOLK

[75] Inventor: Mei-Neng Lin, Keelung, Taiwan

[73] Assignee: Infinite Life Healthy Vegetarian Food Co., Ltd., Keelung, Taiwan

[21] Appl. No.: 587,298

[22] Filed: Jan. 16, 1996

[51] Int. Cl.⁶ ................................................ A23L 1/20
[52] U.S. Cl. ........................... 426/634; 426/104; 426/615
[58] Field of Search ............................... 426/104, 615, 426/634, 582

[56] References Cited

U.S. PATENT DOCUMENTS 3,864,500  2/1975  Lynn ..................................... 426/195
3,941,892  3/1976  Glasser et al. ........................ 426/104
4,072,764  2/1978  Chess .................................... 426/558
4,124,727  11/1978  Rockland et al. ..................... 426/508
5,192,566  3/1993  Cox et al. ............................. 426/104

*Primary Examiner*—Lien Tran
*Attorney, Agent, or Firm*—W. Wayne Liauh

[57] ABSTRACT

A method for making vegetarian yolk and products thereof, in which a suitable quantity of flour and an edible oil are mixed together and agitated evenly before being poured into a frying pan to simmer for about 30 minutes until having a gold-colored crisp layer on the surface thereof. Then, a suitable quantity of smashed beans and cheese cut into fine particles are mixed together and agitated evenly before being poured into a frying pan to simmer for at least 30 minutes until a flagrance is smelled and a loose and block-shaped product is formed which tastes like a pickled yolk.

3 Claims, 2 Drawing Sheets

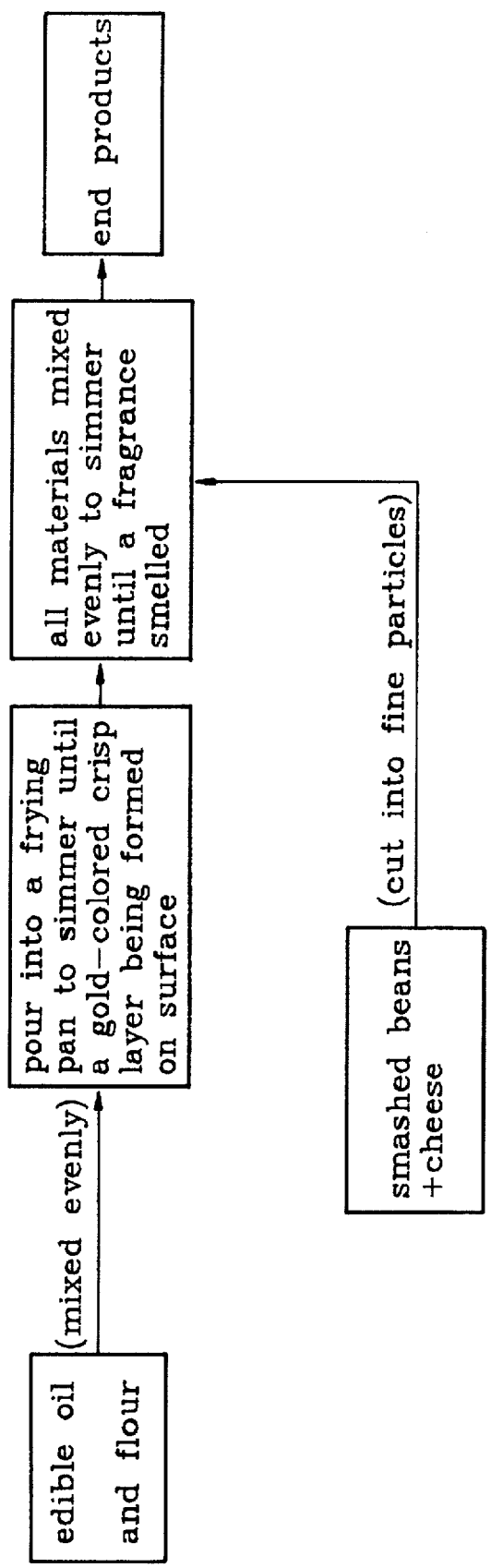
F I G. 1

METHOD FOR MAKING A VEGETARIAN YOLK

BACKGROUND OF THE INVENTION

1. Field of the Invention

This invention relates to a method for making a vegetarian yolk and products thereof, in which suitable quantities of flour and edible oil are mixed together evenly, and then simmered and agitated until a gold-colored crisp layer is formed on the surface thereof. Then, smashed beans and cheese are added therein and mixed together. After it is simmered for at least 30 minutes until a fragrance being smelled, a product tasted similar to a pickled yolk is obtained.

2. Description of the Prior Art

In the current busy society, people have become bored with the life of facing a roaring environment and a lot of meat and fish diet for the three meals daily. Instead, many people like to return to the plain living; therefore, people begin to get rid of the pompous, and to enjoy vegetarian food. Since the vegetarian diet is good for our health, we need a great deal of various kinds of such food for an increasing population who prefer to vegetarian foods. Currently, all poultry that are consumed as foods, such as hens, ducks and geese, are usually raised manually with mass production method. All the poultry are usually injected with a given mount of antibiotics for resisting diseases; as a result, the eggs laid by such poultry contain some viruses or antibiotics, which would effect the user's health.

SUMMARY OF THE INVENTION

The prime object of the present invention is to provide a method for making a vegetarian yolk, of which the first step is to have a suitable quantity of flour and edible oil mixed together, which are agitated evenly before being poured into a frying pan to simmer for about 10-30 minutes until a gold-colored crisp layer is formed on the surface thereof. Then, a suitable quantity of smashed beans and cheese in fine particles are mixed evenly, and are poured into the frying pan to simmer for at least 30 minutes until a fragrance is smelled. In this manner, a product tasted similar to a pickled yolk can be obtained.

Another object of the present invention is to provide a method for making a vegetarian yolk, by which a suitable quantity of carotene is added into the mixture of flour and edible oil before pouring into a frying pan so as to allow such product to possess a color much similar to that of a pickled yolk.

Still another object of the present invention is to provide a method for making a vegetarian yolk, in which a suitable quantity of salt is added into the mixture of flour and edible oil before being poured into a frying pan so as to have a better taste.

A further object of the present invention is to provide a vegetarian yolk, which comprises flour, edible oil, smashed beans and cheese that are mixed together, and then the aforesaid mixture is simmered for a given period of time to form into a product which tastes like a pickled yolk. The product disclosed in the present invention has no residual viruses or antibiotics as contained in a pickled yolk, and has a cholesterol level below 2% of a typical pickled yolk. Thus, the present invention presents a good food for health.

BRIEF DESCRIPTION OF THE DRAWINGS

FIG. 1 is a flow chart, showing the manufacturing procedures of according to a preferred embodiment of the present invention.

DESCRIPTION OF THE PREFERRED EMBODIMENTS

Figure 2:
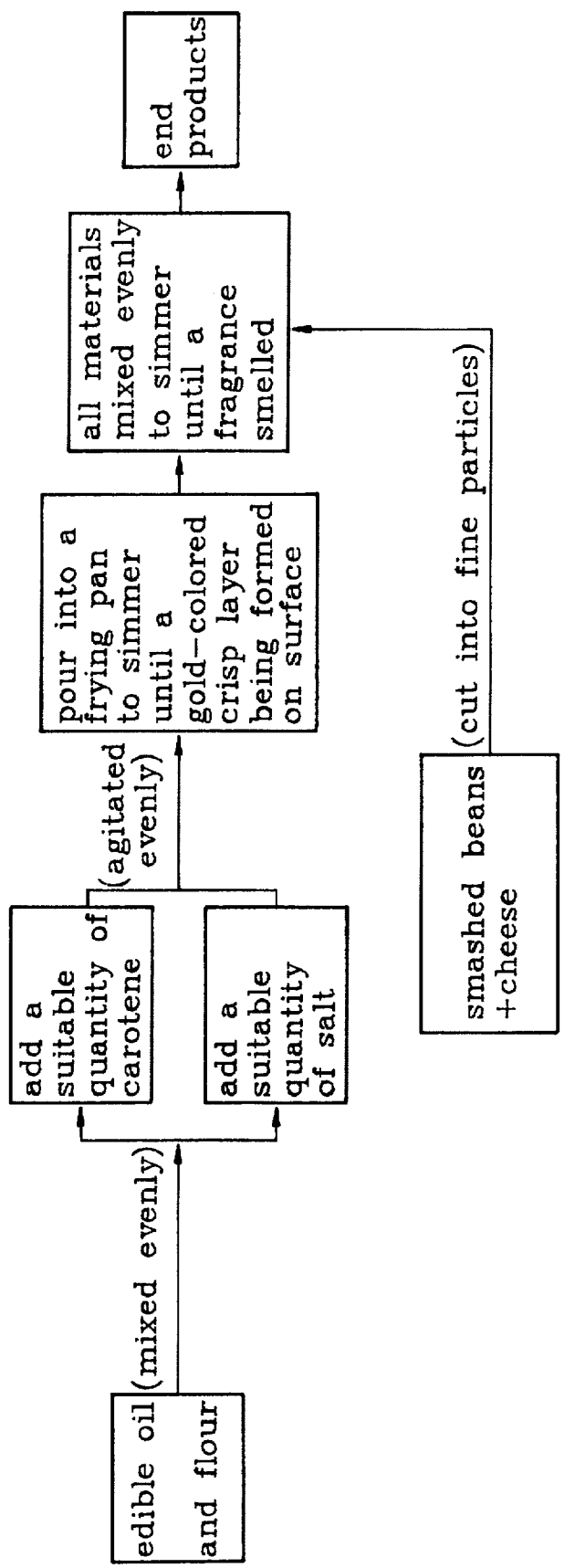
FIG. 2 is a flow chart, showing the manufacturing procedures according to another preferred embodiment of the present invention.

Referring to FIG. 1, it is shown an embodiment according to the present invention, which relates to a method for making a vegetarian yolk and product thereof. The process comprised the steps as follows:

The first step is to have about 14%–26% (in weight) of flour (or other equivalent material) and about 14%–19% (in weight) of edible oil (such as palm oil, or olive oil, etc.) mixed evenly by proper agitation. Then, the aforesaid mixture is put in a frying pan to simmer for about 30 minutes until the surface of such mixture becomes a gold-colored crisp layer.

The second step is to have about 30%–60% (in weight) of smashed beans (or similar material in loose and granular shape) and about 10%–20% (in weight) of cheese (preferably having a smell similar to that of a pickled yolk, and a given viscosity when heated) cut into fine particles before being mixed together. Then, the mixture is simmered to have the cheese dissolved in the smashed beans so as to cause the loose, smashed beans to be glued together.

The third step is to have the materials respectively prepared according to the first and the second steps mixed together and agitated evenly. Then, such mixture is placed in the frying pan to simmer for at least 30 minutes until a fragrance is smelled out of the frying pan. Finally, a loose and block-shaped material is produced, and it is tasted like pickled yolk.

FIG. 2 is a flow chart, showing another embodiment according to the present invention. After about 14%–26% (in weight) of flour and about 14%–19% (in weight) of an edible oil (such as palm oil, or olive oil, etc.) are mixed together as mentioned in the first step. About 0.0015%–0.0025% (in weight) of carotene (to gain a better color) may be added, if necessary so as to have the aforesaid material had a color completely similar to that of yolk. Furthermore, about 0.8%–2.0% (in weight) of salt (so as to meet users' taste) may be added. And then the aforesaid mixture is put into a suitable frying pan to simmer for about 10 to 30 minutes until the mixture appears to have an old-colored crisp layer on the surface thereof. Finally, the mixture is processed according to the aforesaid second and third steps so as to obtained a loose and block-shaped material tasted similar to a pickled yolk.

In brief, a vegetarian yolk can be made according to the present invention by using flour, an edible oil, a smashed bean, and cheese which are mixed up properly. Then, such mixture is put into a frying pan to simmer until a fragrance is smelled. The vegetarian yolk of the present invention will not have any residual virus or antibiotics, and contains less than 2% of the cholesterol typically contained in a pickled yolk. Thus, a healthy food is provided.

I claim:

1. A method for making vegetarian yolk comprising:

a first step of mixing 14%–26% by weight of flour, and 14%–19% by weight of edible oil to form a first mixture, and placing said first mixture into a frying pan to simmer for about ten to 30 minutes until surface of said first mixture has a gold-colored crisp layer;

a second step of mixing 30%–60% by weight of smashed beans, and 10%–20% by weight of cheese cut into fine particles to form a second mixture, and heating said second mixture so as to have said cheese infiltrated into said smashed beans completely, and to have said smashed beans glued together;

a third step of mix together said first and second mixtures obtained in said first step and said second step, respectively, to form a third mixture and putting said third mixture in a frying pan to heat for at least 30 minutes until a fragrance is smelled out of said frying pan to form said vegetarian yolks.

2. A method for making vegetarian yolk as claimed in claim 1, wherein about 0.0015%–0.0025% by weight of carotene is added into said first mixture of said flour and said edible oil during said first step.

3. A method for making vegetarian yolk as claimed in claim 1, wherein about 0.8%–2.0% by weight of salt is added during said first step.

* * * * *